United States Patent [19]
Marnel et al.

[11] Patent Number: 5,357,247
[45] Date of Patent: Oct. 18, 1994

[54] METHOD AND EQUIPMENT FOR ALERTING OF DANGEROUS WATER LEVELS

[76] Inventors: Constantine Marnel, 20 Lavery La.; Mino Marnel, 10 Point Lookout, both of Milford, Conn. 06460

[21] Appl. No.: 17,792

[22] Filed: Feb. 16, 1993

[51] Int. Cl.⁵ .............................................. G08B 23/00
[52] U.S. Cl. ................................ 340/984; 114/183 R; 340/620; 379/40; 379/70
[58] Field of Search ............... 340/984, 623, 624, 426, 340/620; 379/37, 40, 51, 67, 70, 71; 73/308; 114/197, 270, 183 R; 116/26, 109, 110, 227, 228

[56] References Cited

U.S. PATENT DOCUMENTS

| | | | |
|---|---|---|---|
| 4,369,438 | 1/1983 | Wilhelmi | 340/623 |
| 4,692,742 | 9/1987 | Raizen et al. | 340/539 |
| 4,713,835 | 12/1987 | Bond et al. | 379/70 |
| 4,739,786 | 4/1988 | Parkinson | 340/620 |
| 4,748,654 | 5/1988 | Gray | 379/40 |
| 4,904,983 | 2/1990 | Mitchell | 340/426 |
| 5,051,744 | 9/1991 | Ewart | 340/984 |
| 5,130,708 | 7/1992 | Boyden | 340/984 |

*Primary Examiner*—Brent Swarthout
*Attorney, Agent, or Firm*—C T C & Associates

[57] ABSTRACT

An improved alerting system and method of manufacture and assembly for boats that contacts boat owners at a remote location to pending danger of water rising within the boat and permits the boat owner to contact the system to determine the rate of water rising.

3 Claims, 2 Drawing Sheets

METHOD AND EQUIPMENT FOR ALERTING OF DANGEROUS WATER LEVELS

BACKGROUND OF THE INVENTION

Pleasure boat owners often reflect on the possibility of their boat foundering while moored and unmanned or perhaps even underway because of catastrophic on-take of water. This may occur because of storm conditions, failure of any through-the-hull intake or outlet, failure of bilge pumps or non-reported accident.

As is well known, boats have a propensity for taking on water either through seepage around poor through-the-hull fittings or in the case of wooden boats between hull strakes. Most often such seepage is considered normal and is managed at a minimal level by self-activated powered (most often battery) bilge pumps which are usually mounted in the boat's bilge.

Under normal or usual circumstances the bilge pump is able to maintain the minimal water level. However in unusual circumstances, for example in inboard powered boats which are on underway and on plane with external water cooling the rupture of the water outlet hose will quickly flood the engine compartment and bilge before the boat slows and comes off plane. If the engine continues to operate it will continue to pump water until the boat founders or sinks. The boat's engine may continue to operate because the engine's wiring is designed to operate when wet thus does not short out. Unless shut down by the crew, the engine will continue to operate until water is drawn into the engine. In either case a serious situation that can cause loss of life and less importantly loss of the boat.

Similarly, in the case of the unmanned moored or docked boat massive water uptake may occur because of failure of hatches, through-the-hull inlets/outlets, the hull results in potential loss of a boat.

A number of prior art references propound to have developed systems directed at solving the problem. For whatever reason none of these systems have become commercially available leaving the boat owner at the mercy of chance or to devise systems of their own.

OBJECT OF THE INVENTION

It is the object of the instant invention to alert the boat owner, marina or crew that an onboard crisis is developing because of increased water levels in the boat.

It is another object of the invention to provide the apparatus to not only alert about rising water levels but also to provide rate of rising to a remote location.

It is another important object of the invention to provide the boat owner with the details of off-the-shelf equipment and interconnects so that they can install the same in the boat.

PRIOR ART

The following U.S. patents have been found which may reflect on the instant invention.

| U.S. Pat. No. | Date | Inventor(s) |
|---|---|---|
| 427,873 | May 13, 1890 | Jones |
| 3,309,687 | March 14, 1967 | Phipps |
| 3,760,396 | September 18, 1973 | Haselton |
| 3,786,469 | January 15, 1974 | Staempfli |
| 4,187,503 | February 5, 1980 | Walton |
| 4,228,427 | October 14, 1980 | Niedermeyer |
| 4,357,892 | November 9, 1982 | Sveinsbo et al. |
| 4,540,976 | September 10, 1985 | Wegrzyn |
| 4,692,742 | September 8, 1987 | Raizen |
| 4,697,535 | October 6, 1987 | Wileman |
| 4,897,630 | January 30, 1990 | Nykerk |
| 4,904,983 | February 27, 1990 | Mitchell |

Jones relates to a bilge water alarm system in which rising water level raises a float which eventually, at a critical water level, closes an electric circuit to actuate a bell, to provide the alarm.

Phipps relates to pivotally mounted floats which when moved upward about a horizontal axis actuate electrical switches to activate an alarm.

Haselton relates to an enclosed chamber in which is affixed a pressure sensitive diaphragm which when water displacement into the chamber makes contact with a switch which activates an alarm.

Staempfli is a maximum liquid level detector in a vessel (such as a bath tub). The user is warned by sound and/or luminous signal when the maximum level is attained.

Walton discloses a sump alarm device that is mounted on a vertical pump shaft housing of a sump pump. The alarm device is activated when the water level in the sump rises above a predetermined level when the sump pump fails to operate due to loss of electric power or a malfunction in the pump. A switch is connected through a battery to an alarm, such that when the water attains the predetermined level, the alarm is activated. According to conventional drawing symbols, it appears that the alarm is a bell.

Niedermeyer is monitor apparatus for sump pumps. Audible or visual warning signals are used in a pump system having a primary pump and an auxiliary pump to indicate loss of power or a malfunctioning pump. Float switches react to rising liquid level, thereby opening fail-safe circuits and closing warning circuits that give sensory perceptible signals. It is contemplated that the signals would be provided at locations remote from the sump itself, such as in a kitchen. Perceptible signals in the form of a horn and colored lights are disclosed.

Sveinsbo et al. discloses apparatus for warning of the increase of draft in a small boat in a surrounding liquid. A signal emitter and a current source are connected to an electrically activated whistle which is activated whenever an unauthorized person steps on the boat.

Wegrzyn teaches to an alarm device with improved circuit which indicates a disturbance to the quiescent level of a body of water which includes transmittal of a pulsed signal to activate a remote alarm device.

Raizen discloses a security alarm system which utilizes encoded signals to identify a particular location of a breach of the system.

Wileman discloses a marine safety system which is activated by rising water in a ship's hull and solenoid valves which when activated close the secocks in the hull of the ship in preferred sequence.

Nykerk teaches security alarm system which combines a proximity detector with sensors and a unique control unit that provides vocal alarm and reporting system.

Mitchell discloses an alarm system for vehicles which incorporates a detector an auto dialing machine and a radio telephone whose signal is transmitted to an alarm receiving station.

Although each of the cited prior art contains individual components of the instant method invention none have the combination described herein.

SUMMARY OF THE INVENTION

The method of the instant invention relates to a combination of commercially available components, each performing a single activity which when combined will function to alert a boat owner, whether on board or at a remote location to the fact that the water level within the craft has risen above a predetermined level and the rate at which the water level is increasing. The method encompasses the installation of a continuity board and power source which when activated completes a circuit to energize onboard alerting devices such as strobe lights and/or klaxon as well as a preprogrammed cellular telephone auto dialer and answering machine which dials a given sequential series of telephone numbers. When a phone is answered a preprogrammed signal is given to alert the person answering that the craft is shipping water. That person then telephones the answering machine to determine the rate at which the water is rising.

DETAILED DESCRIPTION

Figure 1:
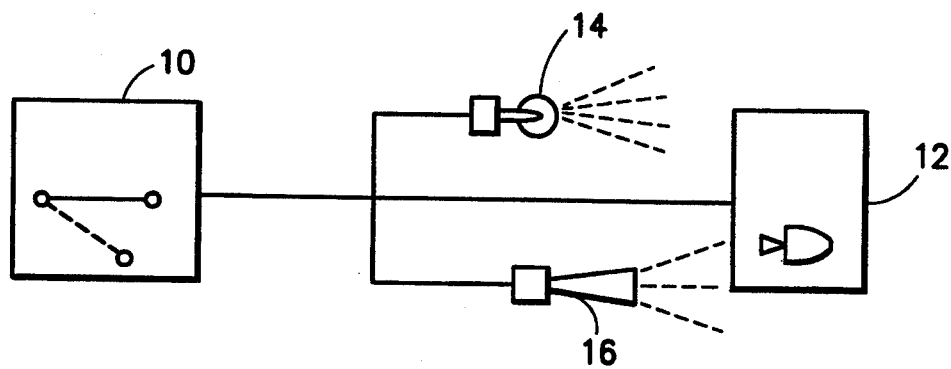
FIG. 1 illustrates the individual units and interconnects required to form a prior art operative system.

Prior art systems FIG. 1 usually utilize a float switch 10 which connects to a radio transmission device 12. When water in the hull rises above a predetermined level the transmission device sends a signal which activates a remote auto dialer which uses telephone land lines to communicate that a signal has been received from the boat. Simultaneously with the activation of the radio transmission device flashing lights 14 and a klaxon 16 are also activated. In recent technology the advent of the cellular radio telephone with built-in auto dialer now enables the telephone land line interconnect to be made via the cellular telephone network. In fact, once a telephone circuit has been completed the person receiving the call will be able to hear the klaxon.

Figure 2:
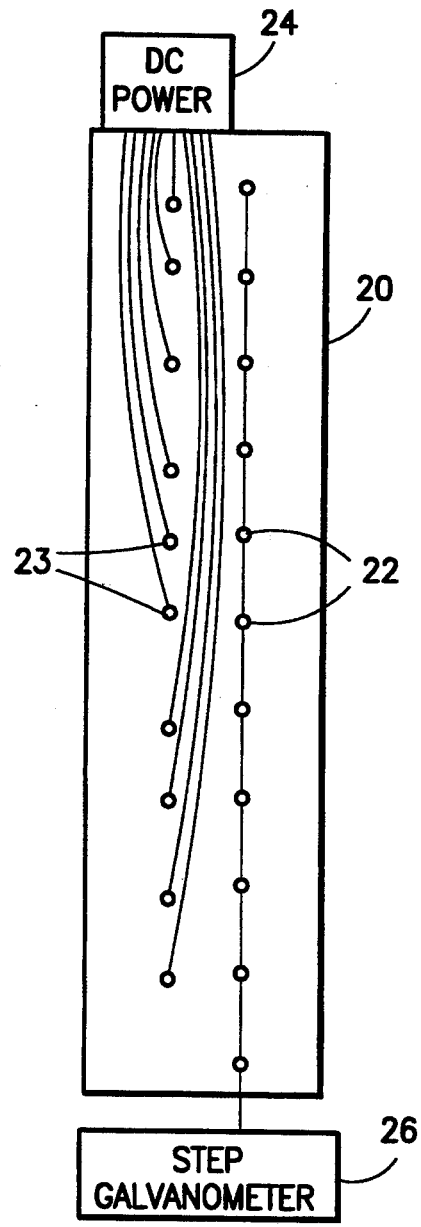
FIG. 2 illustrates the continuity board which records the extent and rate of water level rising within the hull.
Figure 3:
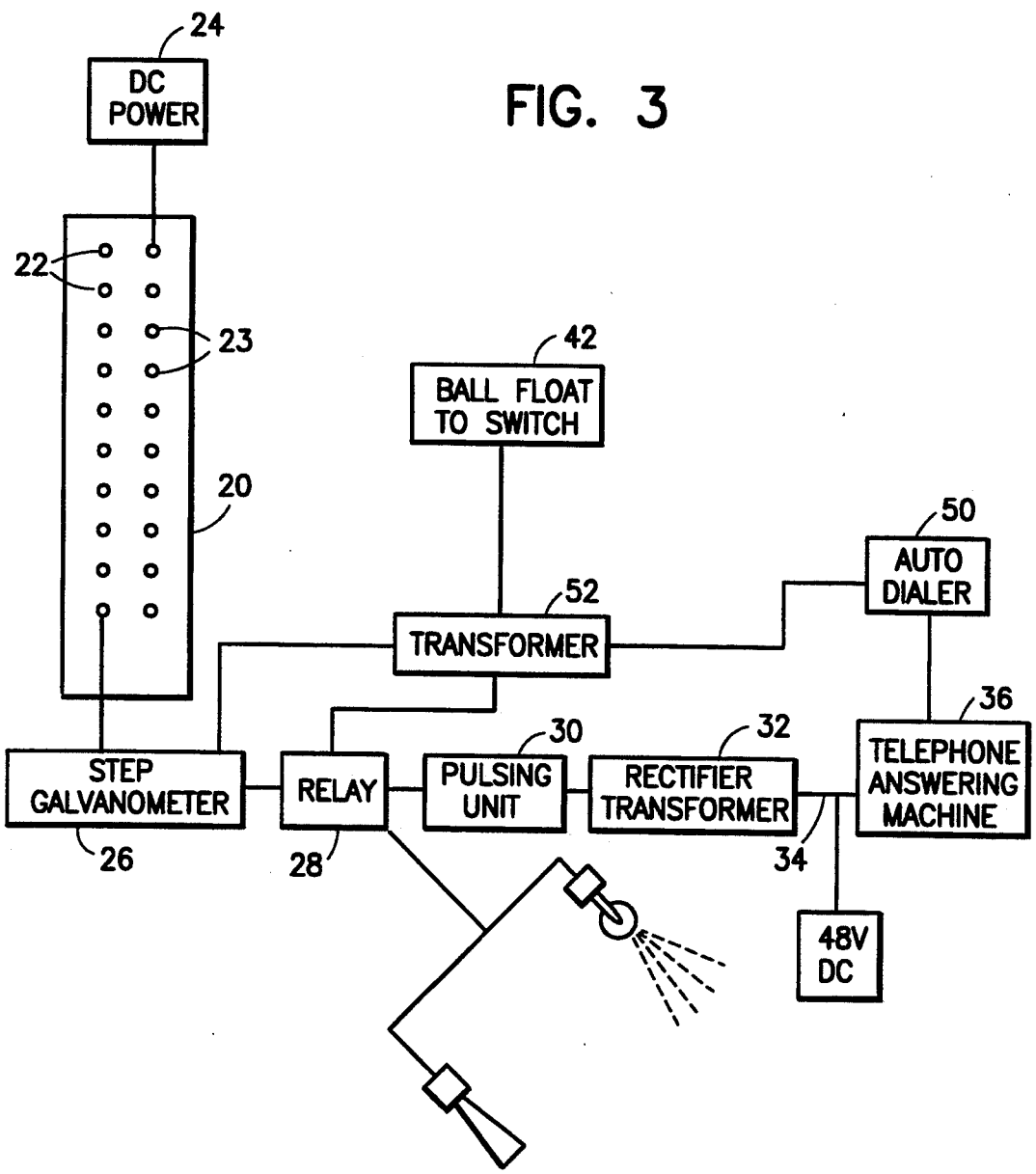
FIG. 3 diagrams the instant invention.

The difficulty with such systems is that it is impossible to determine whether the rate of water rise is sufficient to warrant a panic response. The instant invention overcomes this problem by providing a simple but effective continuity board 20 coupled to an off-the-shelf answering machine as a means of establishing the rate of rising water and reporting the same. FIG. 2 illustrates such a board. Continuity board 20 is made up of a vertical series of parallel pairs of electrodes 22. A dimunitive DC power source 24 supplies low voltage low amperage power to one set of electrodes in each pair, the other of each pair is connected to a step galvanometer. When water levels rise to immerse a given pair continuity occurs and current flows. This is noted by the step galvanometer 26 which detects current flow Step galvanometer 26 when a predetermined current flow is detected completes a circuit with relay 28. Relay 28 powers up pulsing unit 30 which in its simplest form may be a thermal switch and counter which pulses power to rectifier/transformer 32 to provide a milleamp AC surge to line 34 which is connected to telephone answering machine 36. Telephone answering machine responds to the pulsed AC milleamp surge exactly as if the same situation occurred in regular telephone system, known as ringer surge. Answering machine 36 enters into answering mode recording internal generated beep and time and date stamp, i.e. Tuesday, 12:30 a.m. When answering machine disconnects pulsing signal which stops after 5 pulses. Subsequently when the next electrode pairs are immersed the series is reinitiated resulting in recording on answering machine Tuesday 1:25 a.m. and if another two electrodes are immersed the message may be Tuesday 2:25 a.m. Step galvanometer 26 has noted for example first pair 10 milleamp current flow, second pair additional 10 milleamp flow, third pair again of another 10 milleamps or 30 milleamp current flow. The step galvanometer can be connected to directly initiate activation of cellular telephone 40 when a given current flow is attained for example at 50 milleamp maximum current flow for the board being 100 milleamps current flow by activiating a second relay activating transformer rectifer 52 to supply an AC pulse to cellular telephone auto dialer 50. Auto dialer then dials the first of a series of sequential telephone numbers, i.e. if the first doesn't respond in 10 rings goes on to the second, third, etc. until someone responds. When contact is made cellular telephone 50 supplies a prearranged audible signal. The respondee then hangs up. As soon as the circuit is clear the respondee telephones via cellular circuit the call being intercepted by the answering machine. Prerecorded answering machine message indicates that there is a problem. Using a touch tone phone respondee then presses answering machine remote code recognition signal, i.e. 624 to which the answering machine responds you have 3 calls. Respondee then hears beep Tuesday 12:30 a.m., beep Tuesday 1:25 a.m., beep Tuesday 2:25 a.m. Answering machine then indicates that that was the last call. Respondee knows that water level in boat hull is rising for example 1 inch (2.54 cm) per hour, or alternatively that water is rising at a faster or slower rate. A component of the prior art systems a ball float switch 42, may be incorporated into the circuit so that if the system actuation by continuity board circuit fails it activates auto dialer cellular telephone to sound the alert.

The circuitry herein is essentially the same as used by all of the telephone companies in the United States, i.e. constant 48 V DC miniamp current flow to the equipment and a 110 V AC miniamp surge superimposed on the same line to act as the ringer trigger. The circuitry within cellular telephone 50 and answering machine 36 responds to such signal without the need for modification. Similarly cellular telephone and auto dialer 50 and answering machine 36 are usually powered by 12 V AC or DC power thus compatable with boat 12 V DC battery source.

It is understood that continuity board 20 and ball switch are mounted in the bilge in such manner in vertical plane that they will be activated by rising water. Continuity board 20 is mounted inside a rectangular tube which is open at the top and bottom. Thus water may freely rise into the tube and make contact with the continuity board yet be protected from water surges caused by boat response to waves. In addition, time delay circuitry may be incorporated into the continuity board so that current flow between electrode pairs must continue for a given time sequence before step galvanometer receives current. Further all wiring is battery positive to negative ground as is common in boats. Complete standard circuitry has not been shown to avoid complications of the diagram.

Onboard signal that water is rising in the boat may be supplied by relay unit also acting to actuate flashing light 14 and klaxon 16.

FIG. 2 is a rear view of the continuity board 20. Low voltage, low amperage DC power source 24 is individually wired to powered pins 23 whereas pins 22 to which current flows are wired one to one so that step galvanometer 26 will note total current flow as each set of pins is immersed. All wires are insulated and soldered to pins to insure integrity.

It is seen that the invention well attains the stated objects and advantages and others.

The disclosed details are exemplary only and are not to be taken as limitations on the invention except as those details may be included in the appended claims.

What is claimed is:

1. An improved, onboard boat water level alarm to alert at a remote location that water level is rising comprising a water level sensor, said sensor communicating with a step galvanometer, said galvanometer measuring diminutive DC current flow between horizontally paired electrodes when said electrodes are immersed in water, said electrodes receiving said diminutive DC electrical current from an external source, said step galvanometer being in communication with a relay, when said DC current source attains predetermined current levels said galvanometer activates said relay, said relay activating a counting pulsing unit, said pulsing unit pulses electrical power to a rectifier transformer which is in communication with a telephone answering machine; said pulsing unit and said rectifier transformer supplying a milliamp AC ringer surge to said answering machine, said surge activating said answering machine, said answering machine incorporating therein a time and date stamp mechanism, said mechanism recording time and date of said current flow through said water; said answering machine also being connected to a cellular telephone auto dialer, said answering machine communicating a signal to activate said auto dialer, said auto dialer having means to relay a prerecorded message, said activated auto dialer communicating said message to a remote location, a receiver of said message communicating with said answering machine via said cellular telephone, to hear previously recorded time and date stamp, said galvanometer, relay, pulsing unit, answering machine and telephone dialer are interconnected with telephone cable which is powered with a 48 V DC power source.

2. The water level sensor according to claim 1, said sensor comprising a continuity board, said board having multiple horizontally paired electrodes in vertical arrangement along the length of said board, the first of said paired electrodes having a low voltage miniamperage current imposed thereon, the second of said paired electrodes communicating with a step galvanometer, when said horizontally paired electrodes are immersed in water, current flows through said water from said first horizontally paired electrodes to said second horizontally paired electrodes thence to said step galvanometer, said step galvanometer communicating with a relay when predetermined current flow is attained.

3. A method of assembly of an onboard water level sensing and alerting device comprising the mounting of a liquid level sensor continuity board in a boat's bilge in vertical relationship to said boat's hull, said board having a series of vertically aligned horizontally paired electrodes, connecting the first of said paired electrodes to a low voltage/low amperage power source, connecting the second of said horizontally paired electrodes to a step galvanometer, connecting said galvanometer to a relay, connecting said relay to a counter-pulsing unit, connecting said pulsing unit to a rectifier-transformer electrically, connecting said rectifier-transformer to a telephone answering machine, connecting said telephone answering machine to a cellular auto dialer, imposing a 48 Volt DC current on connections between said galvanometer, relay, pulsing unit, rectifier-transformer, telephone answering machine and cellular auto dialer, said galvanometer measuring current flow between said horizontally paired electrodes on said continuity board when said electrodes are immersed in water, said galvanometer activating said relay when a predetermined current flow is attained, said activated relay activating said counter-pulsing unit directing said rectifier-transformer to impose a 110 Volt AC miniamp surge on connections to said answering machine and cellular telephone auto dialer, activating said answering machine to record time and date and to activate said cellular telephone auto dialer to initiate contact to a remote location.

* * * * *